United States Patent [19]
Torngren

[11] 3,826,032
[45] July 30, 1974

[54] APPARATUS FOR TRAPPING CERTAIN CRUSTACEANS AND THE LIKE

[76] Inventor: Frank Axel Torngren, 47 West St., Attlebore, Mass. 02703

[22] Filed: Jan. 31, 1973

[21] Appl. No.: 328,316

[52] U.S. Cl. ................................................ 43/100
[51] Int. Cl. .......................................... A01k 69/08
[58] Field of Search ............... 43/100, 102, 105, 65

[56] References Cited
UNITED STATES PATENTS

| | | | |
|---|---|---|---|
| 218,737 | 8/1879 | Henderson | 43/65 |
| 2,950,562 | 8/1960 | Lothrop | 43/102 |
| 3,045,386 | 7/1962 | Coyne | 43/100 |
| 3,106,602 | 10/1963 | Hartz | 43/54.5 R |
| 3,497,989 | 3/1970 | Schultz | 43/100 |
| 3,708,905 | 1/1973 | Jalbert | 43/100 |

Primary Examiner—Warner H. Camp
Attorney, Agent, or Firm—John A. Haug

[57] ABSTRACT

A trap made of plastic wall segments all formed in a single mold is shaped generally as a parallelepiped. An entrance to an antechamber is located in each of two side walls in alignment with each other with netting extending from a side wall opening to a relatively small ring located in the interior to form a generally frustoconical section through which crustaceans of a desired size can crawl into the trap but once in the trap cannot crawl out. A frame separates the antechamber from a parlor section by mounting another generally frustoconical netting allowing ingress but not egress of the crustaceans. The frame also supports the top side of the trap including a door section and provides means for locking the door section. A plurality of foot elements are located in the bottom side to militate against movement of the trap along the ocean floor. Two forms of clip members are shown for fastening adjacent wall segments together.

20 Claims, 26 Drawing Figures

12(A)

APPARATUS FOR TRAPPING CERTAIN CRUSTACEANS AND THE LIKE

BACKGROUND OF INVENTION

This invention relates generally to apparatus for trapping certain crustaceans and more particularly to an improved trap, frequently referred to in the art as a pot, for lobsters and the like.

Lobster pots or traps have been used for many years and typically are a box like structure constructed of spaced wooden laths and formed with one or more chambers. Entrance is formed by attaching netting to generally two openings with the netting configured as a frustocone, the smaller opening disposed inside the trap. Generally these entrances lead to an antechamber with another frustoconical net leading from the antechamber to an inner chamber or parlor. Lobsters can crawl into these chambers but once inside are unable to crawl out due to the frustoconical shape of the netting. A door of some type is provided in one of the wall members so that the lobsters can be removed from the pot when it is raised into a boat. Generally several stones or bricks are placed in the pot along with bait so that the pot will sink to the ocean floor.

One of the main disadvantages associated with such pots is their relatively short service life. This is due to many factors including the rough treatment normally accorded pots in handling, storms, extremes in weather and the effects of teredos. In fact it has been estimated that of a group of pots up to one third of the group must be repaired or replaced each year. Thus not only is the expense of repairing and replacing these pots undesirable but also the loss in lobsters through broken pots is undesirable.

SUMMARY OF THE INVENTION

An object of the invention is the provision of crustacean traps which are rugged, durable, long lasting, yet inexpensive.

Another object of the invention is the provision of a trap which is easily assembled and is particularly adapted to facilitate replacement of parts such as wall segments and netting.

Another object of the invention is the provision of a trap particularly adapted to withstand salt water, one which will sink to the ocean floor with little or no additional weights, one which will not tend to slip over the ocean floor and one which is easily assembled requiring few parts.

Yet another object of this invention is the provision of a lobster pot which, when lowered to the ocean floor, will inherently be correctly oriented with the bottom facing downwardly, one which has an access door readily and conveniently lockable.

The invention accordingly comprises the elements and combination of elements, features of construction and manipulation and arrangements of parts, all of which will be exemplified in the structure hereinafter described, and the scope of the application of which will be indicated in the appended claims.

Briefly the invention comprises a lobster pot all of whose sides are molded preferably from a single mold. The material employed for the bottom and sides is a tough plastic non reactive with salt water such a polyvinyl chloride (PVC) or acrylonitride-butadiene-styrene (ABS) and for the top a flexible plastic more buoyant than PVC or ABS such as high density polyethylene or polypropelene. Due to the difference in buoyancy the top will inherently be disposed upwardly when the pot is lowered into the ocean. The several walls of the pot comprise a series of intersecting legs to allow circulation of water through the pot. A door is formed in the top wall with the hinges formed integrally with portions of certain legs and other legs cut on a bevel so that the stationary portion of the legs serve as a stop surface preventing inward movement of the door. A frame separates a first from a second chamber and also serves as a structural support for the door in the closed position and also provides lugs which extend through spaces between legs in the door. The lugs receive tangs to lock the door in the closed position. A plurality of foot pads project from the bottom surface and militate against sliding movement of the pot on the ocean floor. Clip elements fixedly secure adjacent wall segments to each other. Openings are formed in two walls and the frame with slotted pegs projecting into the openings. Frustoconical nets are captured in the slots and serve as entrances into the respective chambers.

BRIEF DESCRIPTION OF THE DRAWINGS

In the accompanying drawings in which several of the possible embodiments of the invention are illustrated:

FIG. 12a is a cross section similar to FIG. 12 but taken above the clip and showing a variation of the mating corner portions of certain wall segments;

Similar reference characters indicate corresponding parts throughout the view of the drawings.

Figure 1:
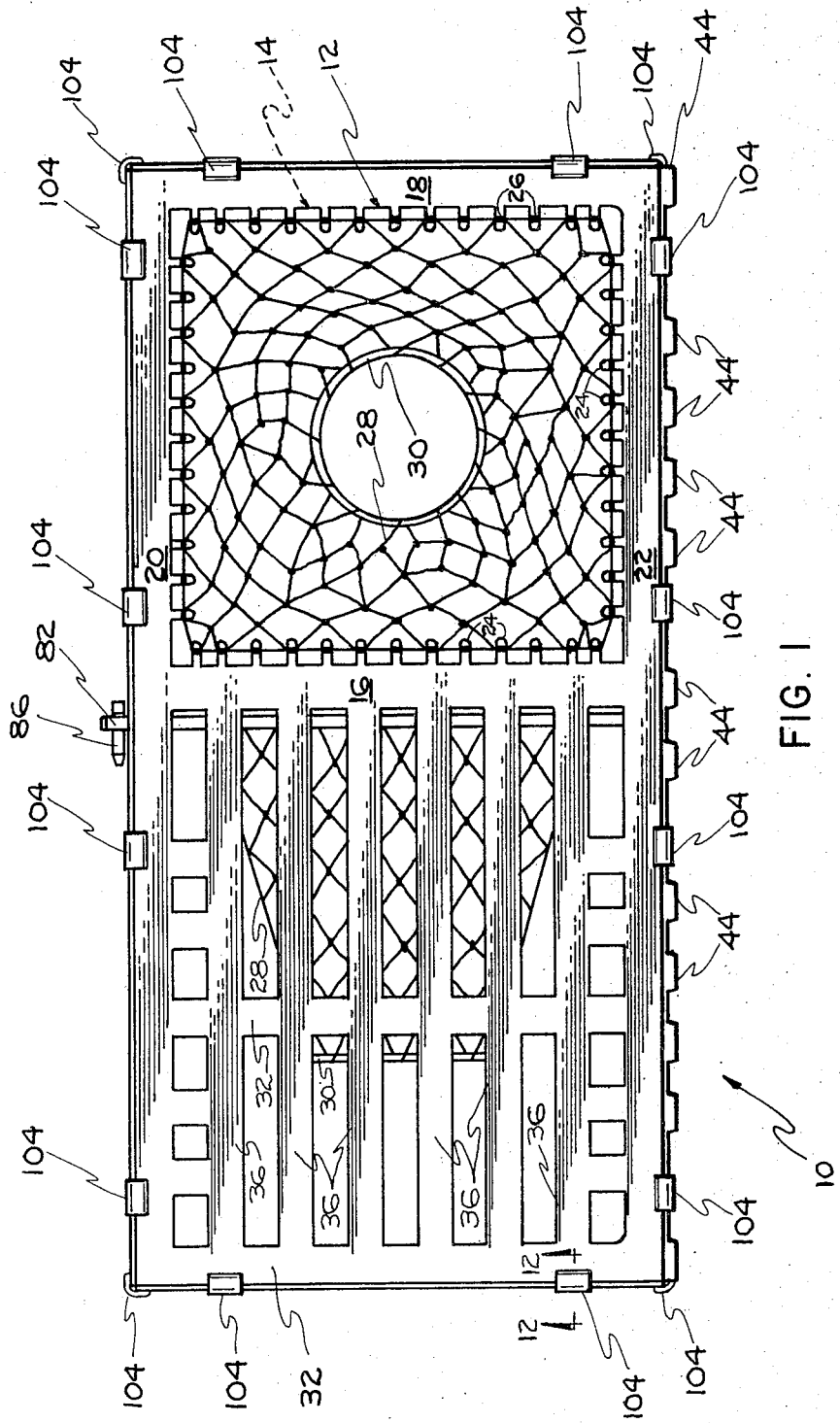
FIG. 1 is a front plan view of a pot made in accordance with the invention.

Dimensions of certain of the parts as shown in the drawings may have been modified or exaggerated for the purposes of clarity of illustration

DESCRIPTION OF THE PREFERRED EMBODIMENTS

Figure 2:
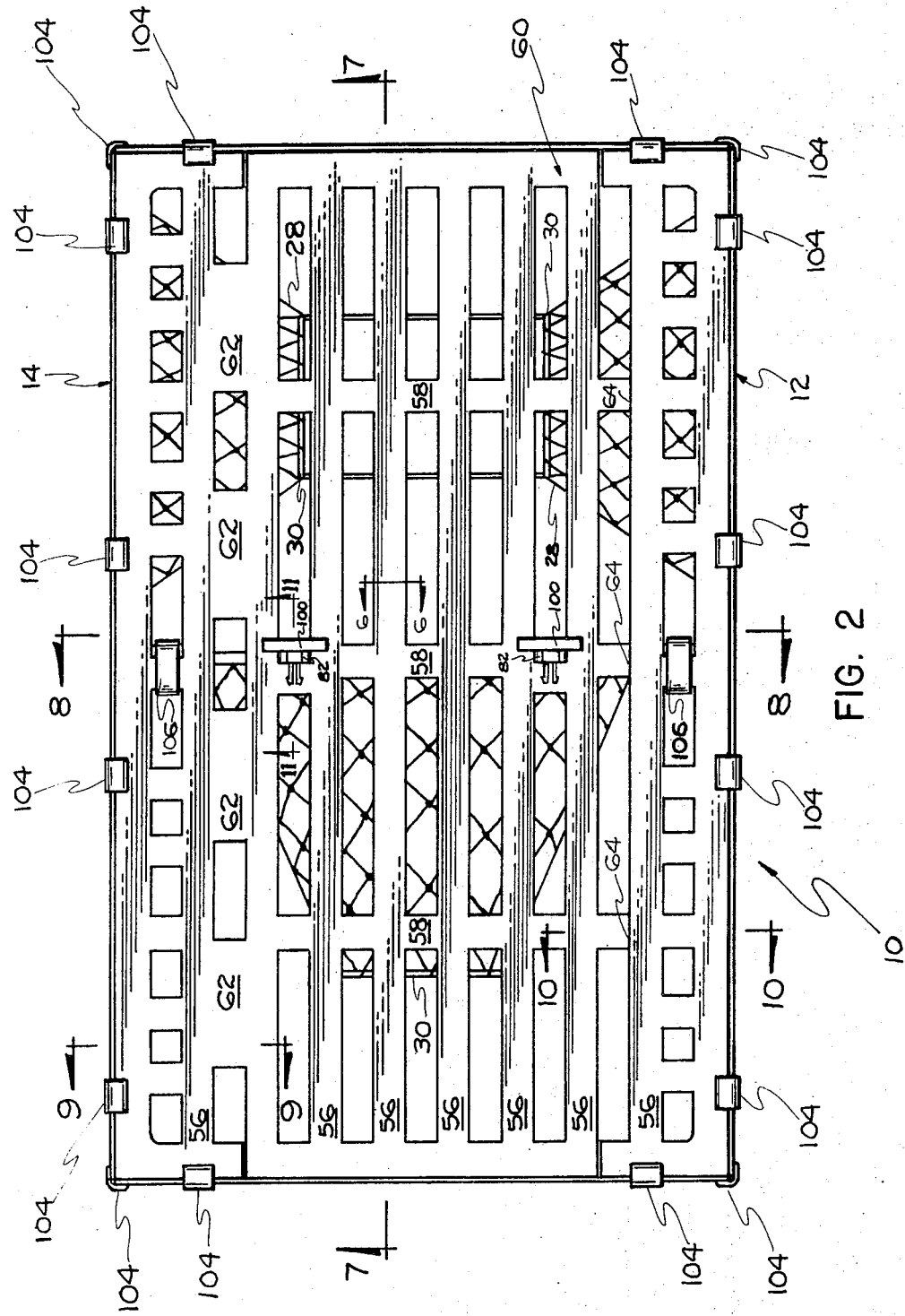
FIG. 2 is a top plan view of the FIG. 1 pot.

Referring now to the drawings, numeral 10 refers generally to a pot or trap made in accordance with the invention and is configured generally as a parallelepiped. As seen in FIGS. 1 and 2 an entrance 12 is defined in the front side wall with a like entrance 14 defined in the back side wall in alignment with entrance 12. Entrances 12, 14 are defined by upstanding legs 16 and 18 joined by respective transversely extending legs 20, 22. Extending inwardly from legs 16-22 into the entrance are a plurality of pegs 24 each of which is provided with a notch 26. Netting 28 is trained through the notches and extends therefrom to loop 30 forming a passageway into the interior of pot 10. As is known in the art, loop 30 is chosen to be considerably smaller than the space enclosed by legs 16-22 to prevent outward migration of any crustaceans which may venture therein.

Front and back sides of pot 10 also comprise upstanding legs 32 intersecting transversely extending legs 36 spaced to allow flow of water therethrough but not movement of crustaceans of desired size.

Figure 3:
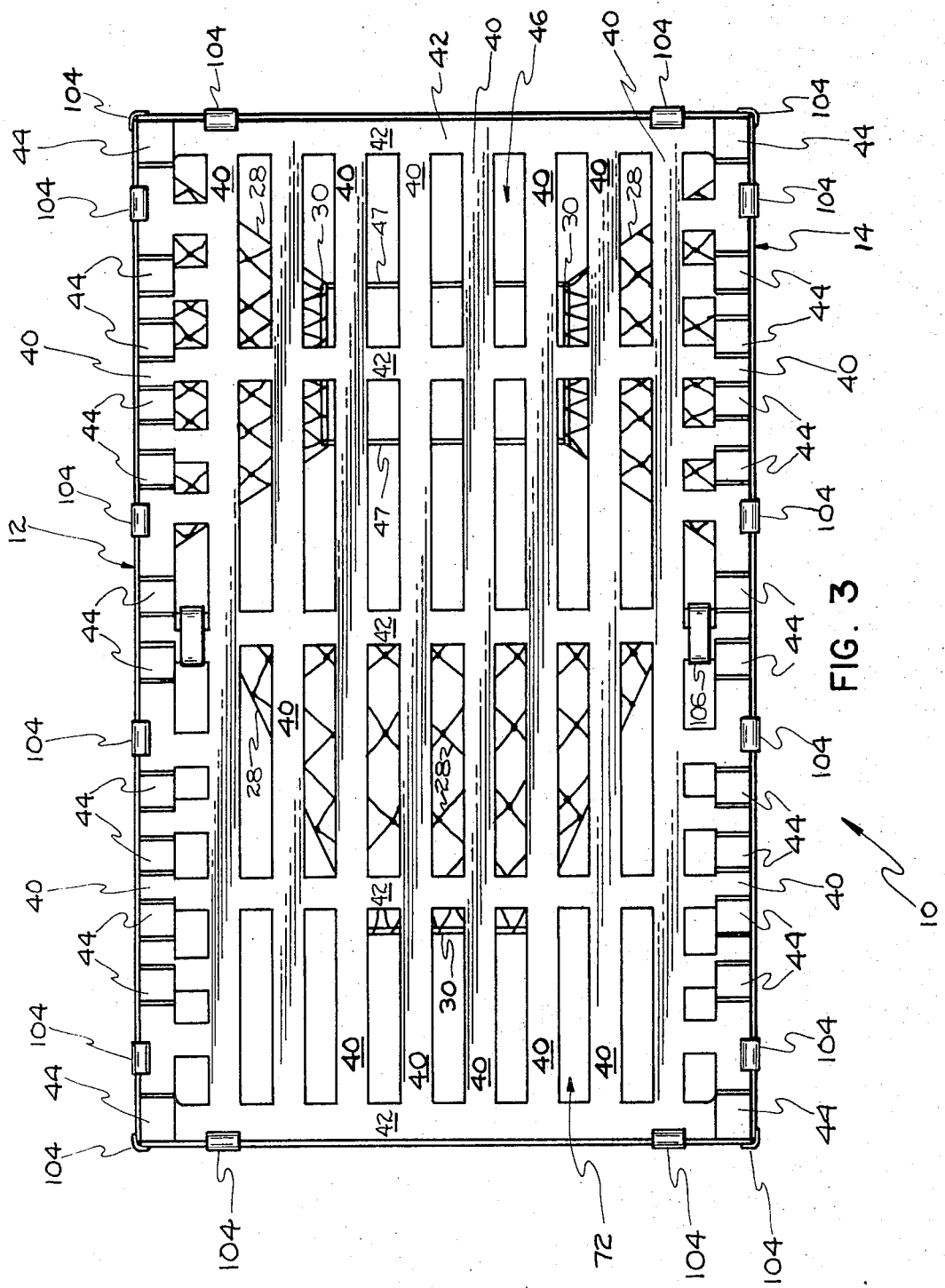
FIG. 3 is a bottom plan view of the FIG. 1 pot.

As seen in FIG. 3, the bottom side of pot 10 comprises a series of intersecting legs 40, 42. Depending from the outer two transversely extending legs 40 are a plurality of foot pads 44. Flexible cords 47 extend from the two loops 30 to bias them inwardly into an antechamber 46.

Figure 4:
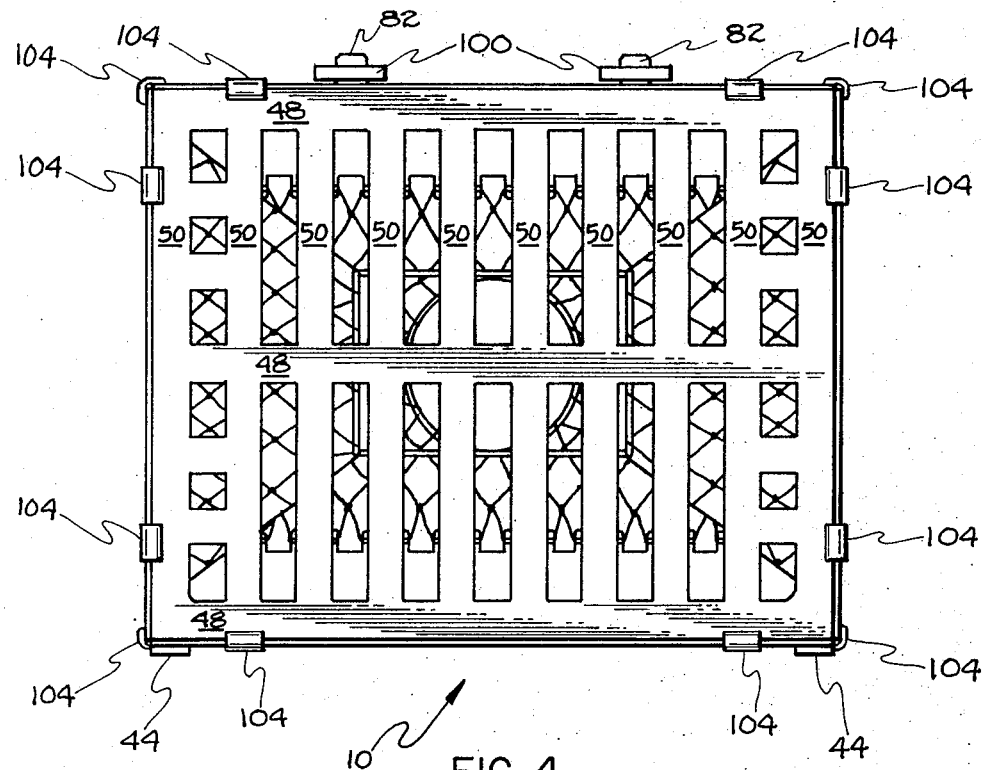
FIG. 4 is a right side plan view of the FIG. 1 pot.
Figure 5:
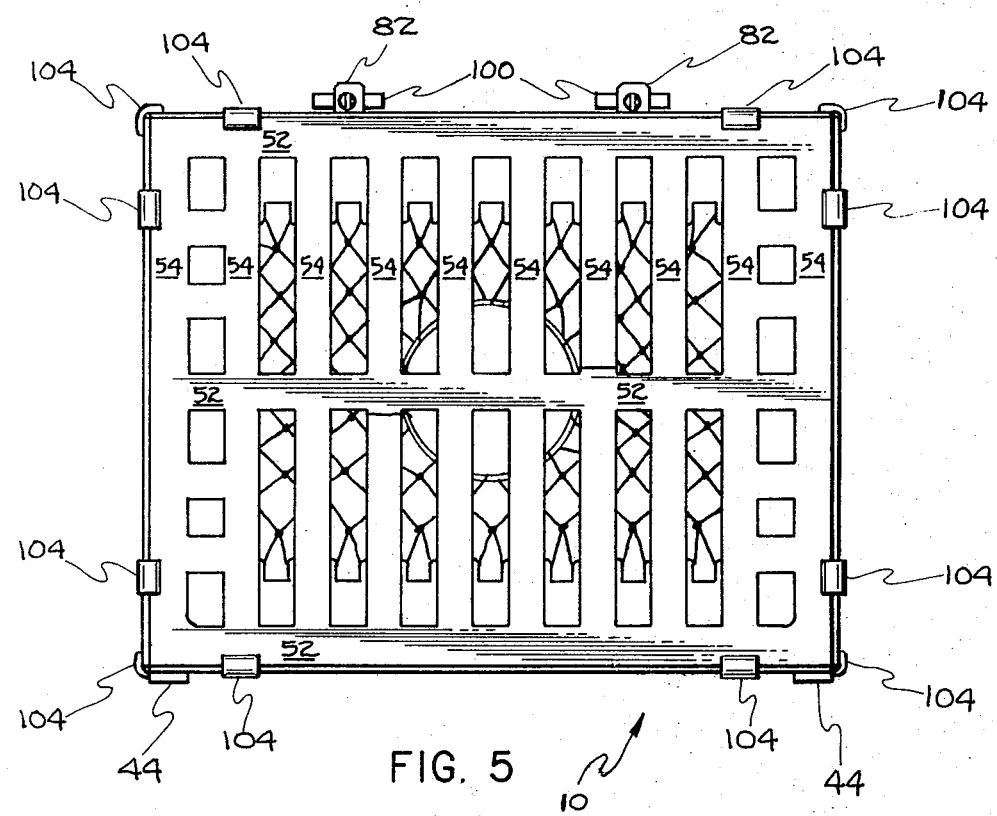
FIG. 5 is a left side plan view of the FIG. 1 pot.
Figure 6:
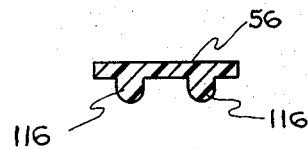
FIG. 6 is a cross sectional view taken on lines 6—6 of FIG. 2.

As seen in FIGS. 4 and 5, left and right side members are also made up of intersecting legs 48, 50 and 52, 54 respectively.

Figure 9:
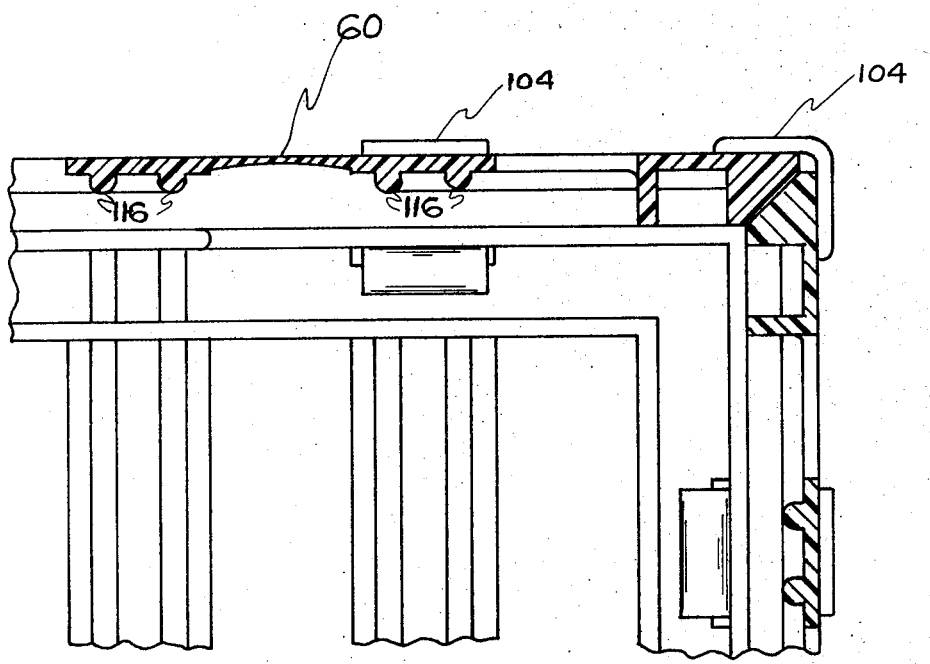
FIG. 9 is a cross sectional view taken on lines 9—9 of FIG. 2.
Figure 10:
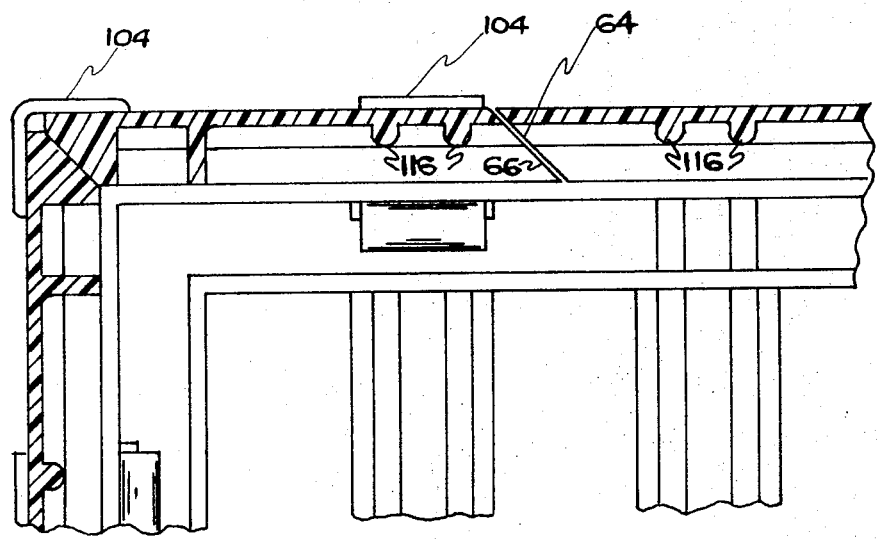
FIG. 10 is a cross sectional view taken on lines 10—10 of FIG. 2.

The top of pot 10, best seen in FIG. 2, also comprises intersecting legs 56, 58. However, a door 60 is also formed therein to permit access into the interior of pot 10. Hinges 62 are formed as seen in FIG. 9 by tapering or decreasing the thickness of the wall section toward the center of the hinges. On the side of the door opposed to the hinges are beveled portions 64 which mate with beveled portions 66 (FIG. 10) which act as stops for door 60.

Figure 8:
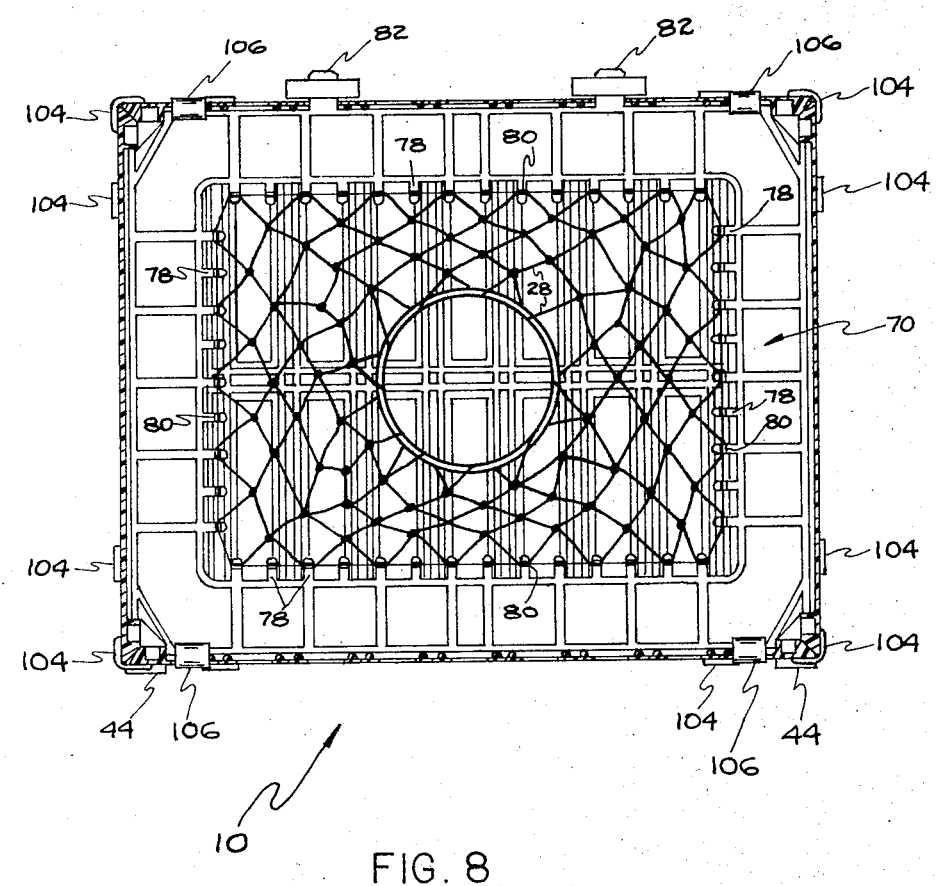
FIG. 8 is a cross sectional view taken on lines 8—8 of FIG. 2.
Figure 7:
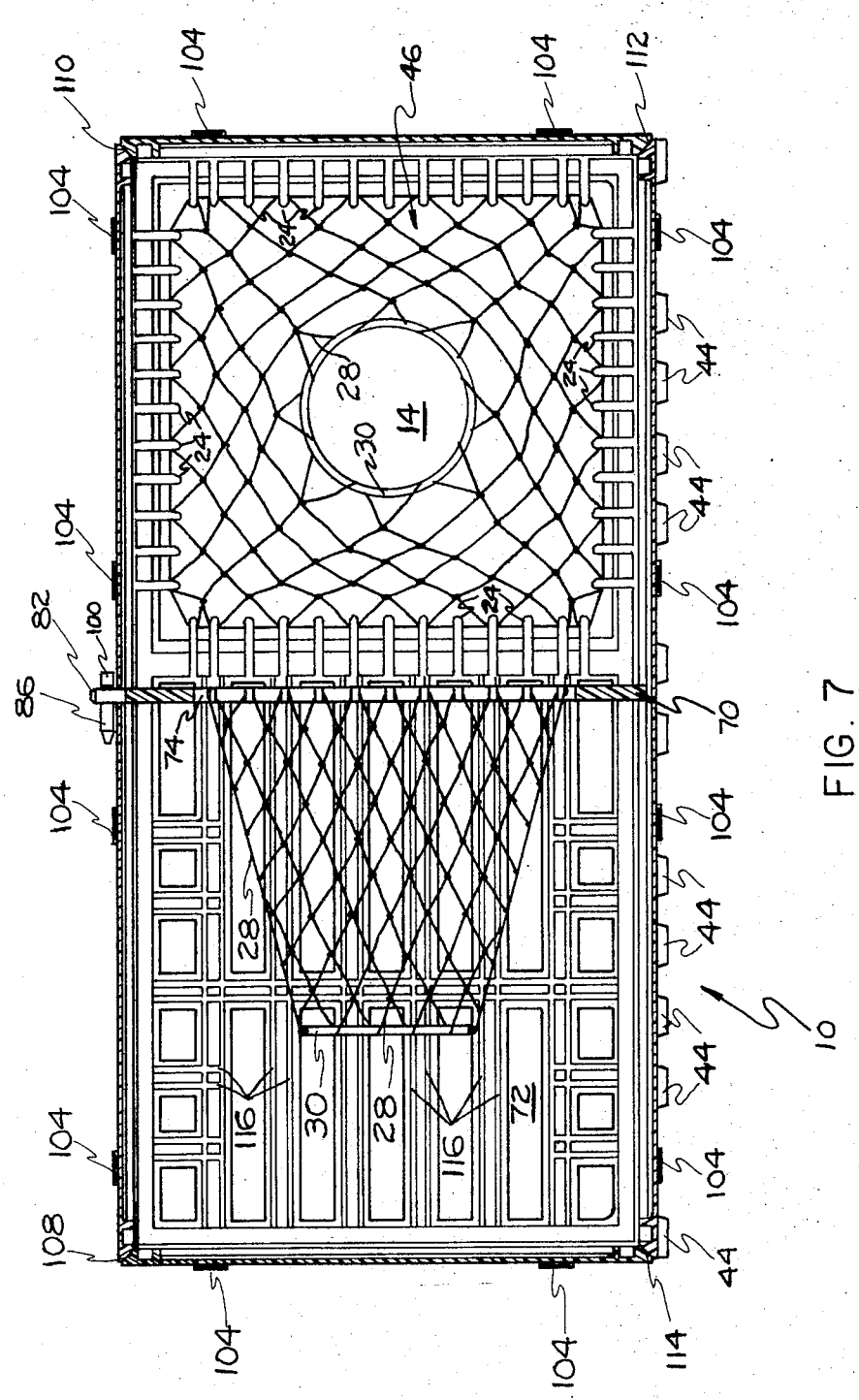
FIG. 7 is a cross sectional view taken on lines 7—7 of FIG. 2.
Figure 11:
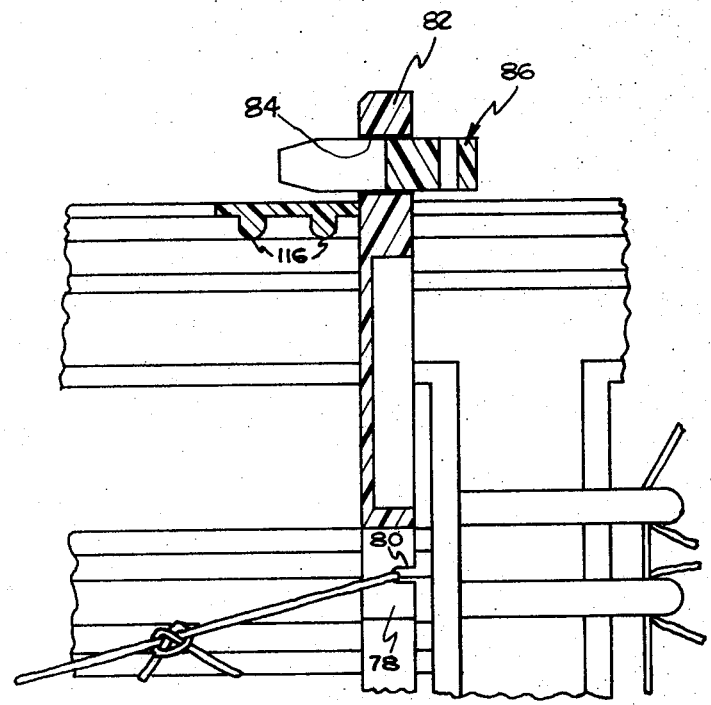
FIG. 11 is a cross sectional view taken on lines 11—11 of FIG. 2.

As seen in FIG. 7 a partition 70 separates the antechamber 46 from chamber 72 with a third entrance 74 formed therein. Partition 70 is formed of a frame received in mating grooves formed in the top, bottom, front and rear wall segments and has a plurality of pegs 78 (FIG. 8) with notches 80 to receive netting 28. Extending upwardly from the partition 70 are two lugs 82 which are received through openings between intersecting legs in the top side of pot 10. An aperture 84 (FIG. 11) is defined in each lug for reception of a bifurcated locking tang 86. As seen in FIGS. 13-17 tang 86 is generally T-shaped having a cross bar 100 and an arm depending therefrom which arm has bifurcations 88, 90 with distal ends having tapered camming ends 92, 94 with locking shoulders 96, 98. Cross bar 100 limits the inward motion and facilitates handling. An aperture 102 may be located in cross bar 100 for reception of a line which can further facilitate removal of the locking member.

Figure 12:
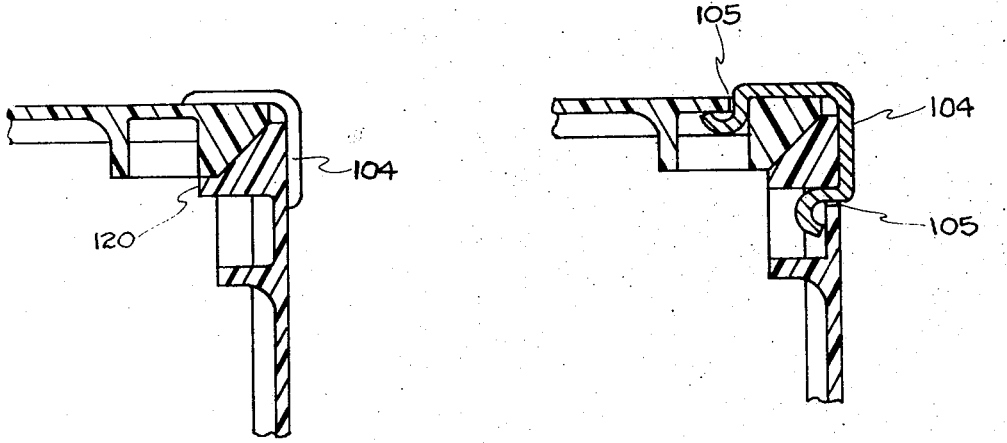
FIG. 12 is a cross section of a corner taken through a clip used to fasten two wall segments together.
Figure 16:
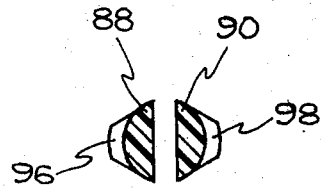
FIG. 16 is a cross sectional view taken on lines 16—16 of FIG. 13.
Figure 13:
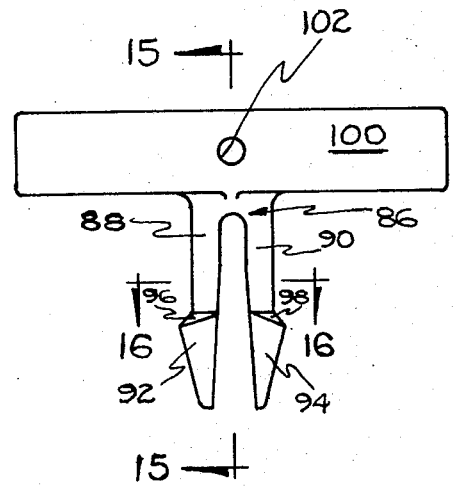
FIG. 13 is a top plan view of a locking member used in the FIG. 1-12 embodiment.
Figure 15:
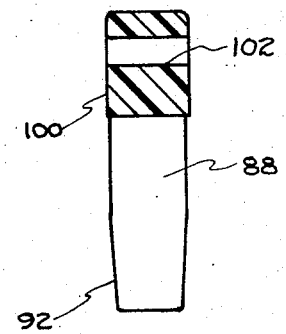
FIG. 15 is a cross sectional view taken on lines 15—15 of FIG. 13.
Figure 14:
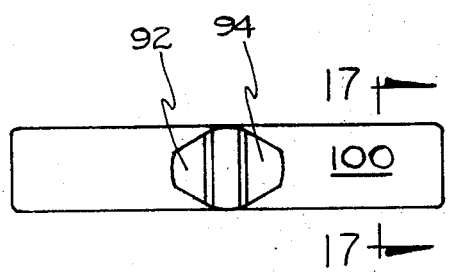
FIG. 14 is a front plan view of the FIG. 12 lock.
Figure 17:
FIG. 17 is a cross sectional view taken on lines 17—17 of FIG. 14.
Figure 19:
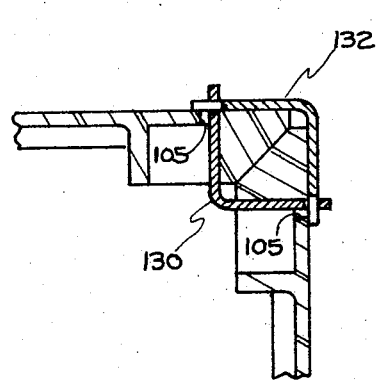
FIG. 19 is a cross sectional view taken on lines 19—19 of FIG. 18.
Figure 18:
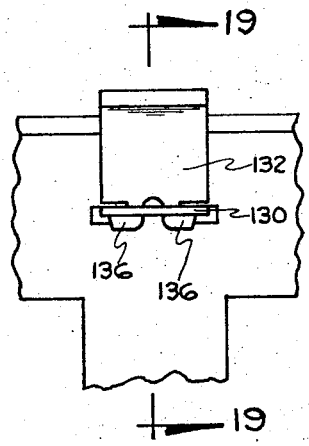
FIG. 18 is a partial view of a wall segment showing an alternate two piece clip construction used to fasten two wall segments together.
Figure 20A:
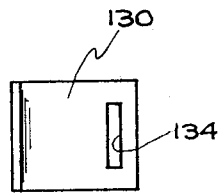
FIG. 20a is a top plan view of one of the two piece clips.
Figure 20B:
FIG. 20b is a front plan view of the FIG. 20a clip piece.
Figure 20C:
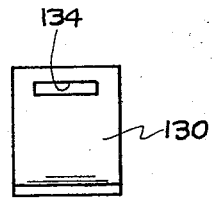
FIG. 20c is a side plan view of the FIG. 20b clip piece.
Figure 21A:
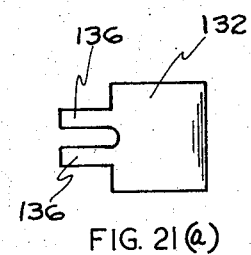
FIG. 21a is a top plan view of the other of the two piece clip of FIG. 18.
Figures 21B, 21C:
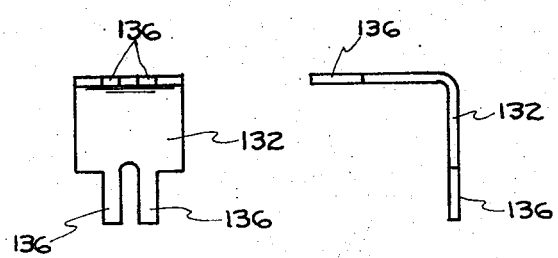
FIG. 21b is a side plan view of the FIG. 21a clip piece.
FIG. 21c is a front plan view of the FIG. 21b clip piece.

The side partitions may be fastened together in any convenient way as by cementing or as shown in the drawing, particularly FIG. 12 by using spring biased clips 104 as fasteners which capture contiguous corner portions of adjacent wall segments. Clips 104 are provided with legs having J-shaped portions which lock the clips in place. Slots 105 are provided in each partition adjacent the side edge to lockingly receive an end of clip 104. Similar clips 106 are used to fix partition 70 in place.

The seven partitions which make up the main portions of the pot are sized such that they can be molded in a single mold. Each of the outer six partitions is formed with a 45° beveled inwardly facing surface forming interfaces to facilitate alignment; see 108, 110, 112 and 114 in FIG. 7.

If desired a lip 120 (FIG. 12a) may be formed on one of the mating beveled surfaces to facilitate proper alignment. This is particularly advantageous to provide support for the top side wall.

In order to provide stiffness for the various legs beads 116 are preferably formed extending longitudinally along the various legs.

An alternative clip arrangement for fastening the various wall or partition segments together is shown in FIGS. 18-21 in which two clip members 130, 132 lockingly receive each other. Both members are essentially right angle pieces with member 130 having a slot 134 located near each distal end thereof. Member 132 is provided with a pair of bifurcated segments 136 at each distal end adapted to be received in slots 134. Member 130 is placed inside the corner formed by two partitions so that its ends project through respective slots 105 in the partition segments, then member 132 is placed against the outside corner so that tangs 136 project through slots 134. Then bifurcations 136 are bent apart to lock the clip and concomitantly the segments together.

Thus by means of the invention an economical trap is provided which is exceptionally durable yet easily manufactured. An exemplary trap was constructed by molding the seven wall segments in a single mold by employing inserts in the mold and by choosing appropriate dimensions for the length, width and height of the trap. This exemplary trap has overall dimensions of 15¾ inches high by 19½ inches wide by 32 inches long. Assembly of the trap is simple and can easily be accomplished not only by the manufacturer but also by the end user should the trap be sold in kit form. The seven wall segments fit precisely together, the clips are pushed into place and the netting trained through the notches in the pegs. The two antechamber netting rings are connected to each other and the parlor netting ring is connected to the right end wall segment and lastly the locking tangs are inserted through the lug apertures to complete the assembly. During normal usage the netting is the only portion which periodically must be replaced. Replacement is readily accomplished due to the provision of the slotted pegs by merely pulling the net out of the slots and detaching the inner ring from its flexible cords maintaining it in its proper location and then training the new net through the same slots and reattaching the flexible cords. In prior art devices the netting typically is weaved along wooden laths which are nailed into the trap frame. Thus to replace the netting the laths have to be pried out of the trap which task is normally quite difficult due to the effects of the weather and ocean on the trap as well as being time consuming. Should a wall segment be damaged it is merely replaced with an interchangeable wall segment which is conveniently formed to the precise dimensions of the broken segment due to employment of the single mold and inserts.

Although the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. Apparatus for trapping selected crustaceans comprising a housing having molded wall segments, each segment being provided with apertures to allow circulation of water therethrough, means separating the housing into first and second chambers, first entrance means formed in at least one wall segment allowing ingress from outside the housing into the first chamber, the entrance means including a cut out area defined in the wall segment, a plurality of fingers lying in the plane of the wall segment and projecting into the cut out area, a net attaching slot formed in each finger and second entrance means formed in the separation means allowing ingress from the first chamber into the second chamber.

2. Apparatus according to claim 1 in which the housing is composed of a plurality of walls, each wall being a single molded piece, each wall having a perimeter formed with a beveled surface which forms an interface between adjacent walls.

3. Apparatus according to claim 2 in which a lip extends from the interior side of the beveled surface of a wall, the beveled surface of the respective adjacent wall being cut away at the interior side thereof to mate with the lip.

4. Apparatus according to claim 2 in which a channel is formed between respective side walls to facilitate placement of adhesive to fixedly position the walls.

5. Apparatus according to claim 2 in which a plurality of slots are formed along the edge of the walls, the slots being arranged along the edge of the wall in alignment with the slots on the contiguous edge of the respective adjacent wall to form a plurality of pairs of slots and a plurality of clips each having two ends, the ends of a clip being received through respective slots of a pair to fixedly position the walls.

6. Apparatus according to claim 5 in which each clip is formed of two legs extending generally at right angles to each other, each leg having a generally J-shaped portion extending inwardly from the distal free end thereof, the curved section of the J-shaped portion being caught behind the respective wall portion.

7. Apparatus for trapping selected crustaceans comprising a housing having molded wall segments, each segment being provided with apertures to allow circulation of water therethrough, means separating the housing into first and second chambers, first entrance means formed in at least one wall segment allowing ingress from outside the housing into the first chamber and second entrance means formed in the separation means allowing ingress from the first chamber into the second chamber, a plurality of slots formed along the edge of the walls, the slots being arranged along the edge of the wall in alignment with the slots on the contiguous edge of the respective adjacent wall to form a plurality of pairs of slots and a plurality of clips each having two ends, the ends of a clip being received through respective slots of a pair to fixedly position the walls, each clip is formed by two legs extending generally at right angles to each other, a slot formed in the distal end portion of each leg, a mating clip formed of two legs extending generally at right angles to each other, bifurcated segments formed in the distal end portion of each leg of the mating clip, the bifurcated segments of an end portion being received in the slot of a respective end of a clip, the segments spread apart to lock the clip and mating clip in place.

8. Apparatus according to claim 1 including a plurality of foot pads depending from the bottom wall segment to militate against movement along the ocean floor.

9. Apparatus for trapping selected crustaceans comprising a housing having molded wall segments, each segment being provided with apertures to allow circulation of water therethrough, means separating the housing into first and second chambers, first entrance means formed in at least one wall segment allowing ingress from outside the housing into the first chamber and second entrance means formed in the separation means allowing ingress from the first chamber into the second chamber, a top wall segment, the top wall segment being composed of a plurality of intersecting leg members, a lockable door provided in the top wall segment, selected leg members being cut to form the door, at least one of the cuts being beveled to form a stop surface to limit swinging of the door into the apparatus, hinge elements integrally formed in other selected leg members to swingingly attach the door to the top wall segment and means to lock the door in the closed position.

10. Apparatus according to claim 9 in which the hinge elements are formed by tapering the thickness of a leg member throughout essentially its entire width to a selected minimal thickness at the center of the leg member.

11. Apparatus according to claim 1 in which the wall segments include strengthening means running longitudinally along the length of the leg.

12. Apparatus according to claim 11 in which the strengthening means comprises a pair of beads.

13. Apparatus according to claim 9 in which the means separating the first and second chambers comprises a generally rectangular frame member having an opening therein, a plurality of lugs lying in the plane of the frame member and depending from the frame member adjacent the opening, and net means attached to the lugs to form the second entrance.

14. Apparatus according to claim 13 in which a slot is provided in each lug, and netting material is received in the slot of selected lugs.

15. Apparatus for trapping selected crustaceans comprising a housing having molded wall segments, each segment being provided with apertures to allow circulation of water therethrough, means separating the housing into first and second chambers, first entrance means formed in at least one wall segment allowing ingress from outside the housing into the first chamber and second entrance means formed in the separation means allowing ingress from the first chamber into the second chamber, a top wall segment, the top wall segment being composed of a plurality of intersecting leg members, a lockable door provided in the top wall segment, selected leg members being cut to form the door, at least one of the cuts being beveled to form a stop surface to limit swinging of the door into the apparatus, hinge elements integrally formed in other selected leg members to swingingly attach the door to the top wall segment and means to lock the door in the closed position, the means separating the first and second chambers comprises a generally rectangular frame member having an opening therein, a plurality of lugs depending from the frame member adjacent the opening, and net means attached to the lugs to form the second entrance, lugs extend from the frame member and extend through openings between intersecting legs in the door, a bore is provided through each lug in a portion thereof extending above the door, and a locking tang is received in each bore to lock the door.

16. Apparatus according to claim 15 in which each tang is generally T-shaped having a cross arm to serve as a handle and a stop element and an arm depending therefrom, the arm having a free distal end which is bifurcated to permit the bifurcations to be compressed, each bore in the lug being so sized that the compressed bifurcations can be inserted therethrough.

17. Apparatus according to claim 16 in which the free distal end portions of the bifurcations are tapered to form a cam surface to facilitate insertion of the tang into the bore.

18. Apparatus according to claim 17 in which the periphery of the arm between the cam surface and the cross bar is less than at least a portion of the cammed surface so that a shoulder is formed on the tang arm to lock to the tang in the lug.

19. Apparatus according to claim 9 in which the top wall segment is more buoyant than the bottom wall segment so that upon dropping into the water the top will be disposed upwardly.

20. Apparatus according to claim 1 in which the bottom and side wall segments are composed of a tough relatively heavy plastic and the top wall segment is made of a flexible light plastic.

* * * * *